Patented Aug. 17, 1937

2,090,429

UNITED STATES PATENT OFFICE 2,090,429

LYSERGIC ACID HYDRAZIDE AND A PROCESS FOR ITS MANUFACTURE

Arthur Stoll and Albert Hofmann, Basel, Switzerland, assignors to the firm Chemical Works, formerly Sandoz, Basel, Switzerland No Drawing. Application August 25, 1936, Serial No. 97,844. In Switzerland December 11, 1935

10 Claims. (Cl. 260—25)

The present invention relates to lysergic acid hydrazide and to a process for its manufacture.

Investigations carried out in the last years with the known alkaloids from ergot (secale cornutum) by treating them with aqueous or alcoholic alkali solutions, have conducted to the isolation of two degradation products, one being an acid of the formula $C_{16}H_{16}O_2N_2$, called lysergic acid (see W. A. Jacobs and L. C. Craig, Nature 133, 579 (1934) London), the other being an amide of the formula $C_{16}H_{17}ON_3$, called ergine, (see S. Smith and G. M. Timmis, Journ. Chem. Soc. 1932, 763).

All typical color reactions of the ergot alkaloids, like the beautiful blue coloration in glacial acetic acid containing iron chloride in presence of concentrated sulphuric acid (Keller's reaction), the violet-red coloration with an alcoholic solution of p-dimethyl-aminobenzaldehyde on underlaying with sulphuric acid, (Van Urk's reaction) are due to the presence in their molecule of lysergic acid. The complex alkaloids of ergot have been built up by the nature by linking the lysergic acid to more simple and known compounds like proline, 1-phenyl-alanine, isobutyryl-formic acid, pyroracemic acid etc., and it has been possible to separate ergotoxine respectively ergotinine into its constituents ergine, proline, 1-phenylalanine and isobutyryl-formic acid (W. A. Jacobs and L. C. Craig, Journ. Americ. Chem. Soc. 57, 383 (1935), Journ. Biol. Chem. 68, 595 [1935]). To the complex nature of the alkaloids of ergot is due the fact that on treatment with chemicals they become destroyed to a large extent and that only small quantities of pure degradation products can be isolated. The lysergic acid and its amide is relatively resistant to the action of alkalis and this is the reason why these compounds have been obtained in a relative good yield on alkaline hydrolysis of these alkaloids; but even under optimal conduction of the hydrolysis these compounds are obtained only in a yield of 25-30 per cent of the theory. It was therefore very important to find a process which would give higher yield of these substances.

It has now been found that when suitable derivatives of lysergic acid are subjected to a treatment with hydrazine, lysergic acid hydrazide will be obtained with a very good yield. As starting products for the preparation of lysergic acid hydrazide can be used, for example, the esters and amides of lysergic acid, especially the alkaloids of ergot that contain lysergic acid, whereby for the preparation of the hydrazide the pure alkaloids like ergotamine, ergotoxine, ergotaminine, ergotinine, ergobasine etc. and also raw alkaloids or raw mixtures thereof can be used.

In order to prepare lysergic acid hydrazide, the suitable lysergic acid derivatives are heated with hydrazine hydrate preferably to 80-118° C. under reflux condenser, whereby it is sometimes also advantageous to work in closed vessels under pressure at a temperature of 80-160° C., or in a suitable solvent like propylalcohol, butyl-alcohol, pyridine etc., or in an inert atmosphere like in nitrogen gas.

The degradation of alkaloids of ergot with hydrazine to lysergic acid hydrazide is, especially with respect to the obtained yield, much superior and rational as compared with the known degradation with aqueous or alcoholic alkalis. The fact that by the present process not the lysergic acid, but its hydrazide will be obtained, is a further advantage, because this new derivative of lysergic acid can by one simple recrystallization be obtained in quite pure state and is more stable than the free lysergic acid. Furthermore the hydrazide is a more suitable starting product for synthetical work than the free acid.

A further important advantage of the new process in comparison with the known processes is that it is no more necessary to start from pure ergot alkaloids, as by the hydrazine process raw alkaloids and the noncrystallizable residues of extraction can be used and the lysergic acid hydrazide easily extracted from the reaction medium, owing to its good crystallization properties and the stability of the compound. Instead of direct degradation of ergot alkaloids it is natural that the lysergic acid hydrazide can also be prepared from free lysergic acid by treating same for example with diazomethane and subjecting the methylester of lysergic acid thus obtained to a treatment with hydrazine hydrate. But the direct treatment of alkaloids with hydrazine is naturally simpler and gives also a greater yield than if the hydrazide is prepared by this obvious way.

The lysergic acid hydrazide is very difficultly soluble in water, ether, benzene, chloroform, rather difficultly soluble in pyridine and in hot absolute ethanol. From this last solvent it crystallizes in form of beautiful, compact, clear, on six sides cut crystal plates, that melt under decomposition at 235-240° C. (corr). The hydrazide is easily soluble in acids yielding good crystallizing salts. A trace of this substance dissolved in glacial acetic acid containing ferrichloride, gives with concentrated sulphuric acid a beautiful blue coloration. Dissolved in a 1% ethanol solution of p-dimethylamino-benzaldehyde it gives on underlaying with concentrated sulphuric acid a violet-red zone.

The analysis of the compound dried in high vacuo at 100° C. has given the following data:

| Found | Calculated |
|---|---|
| Percent | Percent |
| C 68.00 | C 68.04 |
| 67.85 | |
| H 6.80 | H 6.43 |
| 6.82 | |
| N 19.24 | N 19.86 |
| 19.48 | |

The new compound is optically inactive, because the optically active lysergic acid becomes racemized on treatment with hydrazine, but this racemic hydrazide can be separated into its optic antipodes, for example with $d-\alpha$-bromocamphor-$\pi$—sulphonic acid. The new lysergic acid hydrazide can be used as starting material for the synthesis in the field of alkaloids of ergot.

One object of the present invention is therefore a process for the manufacture of lysergic acid hydrazide by heating suitable derivatives of lysergic acid with hydrazine hydrate at temperatures of 80–118° C. under a reflux condenser or at 80–160° C. in a closed vessel under pressure and eventually in presence of a solvent and in inert atmosphere.

Another object of the present invention is the use of raw alkaloids of ergot and of noncrystallizable residues obtained in the manufacture of ergot alkaloids for the purpose of preparing lysergic acid hydrazide, by heating them with hydrazine hydrate.

Still another object of the present invention is the lysergic acid hydrazide, which is a new derivative of lysergic acid suitable for further synthesis in the field of ergot alkaloids and which is a crystalline substance melting under decomposition at 235–240° C. (corr), very difficultly soluble in water, ether, benzene and chloroform, soluble to a small extent in pyridine and in hot absolute ethanol, which yields with acids water soluble salts and gives on Keller's reaction a blue coloration and on Van Urk's reaction a violet-red zone.

The following examples without being limitative show the manner in which the present process can be carried out, the parts being by weight.

*Example 1*

One part of lysergic acid methylester, recrystallized from benzene (P. F. 167–171° C.; $[\alpha]_D^{20} = +79°$ is dissolved in 4 parts of hydrazine hydrate and heated during 17 hours in a bath at about 110° C. Already after 3–5 hours it can be observed that in the yellow-brown solution compact, nearly colorless spear like crystals become formed. After 15 hours no sensible increase in the formation of crystals will be observed, the reaction mass is then put in a cold place for 24 hours in order to complete the crystallization. After this time the crystals are filtered and washed with some absolute ethanol. Yield 0.7 part. The nearly colorless raw crystallized product is then dissolved in about 250 parts of hot absolute ethanol. On cooling down the pure hydrazide precipitates in form of compact, clear tables, cut on six sides. It possesses the above described properties.

*Example 2*

One part of ergotamine is suspended in 10 parts of hydrazine hydrate and heated in a nitrogen atmosphere at 100° C. The substance becomes dissolved very rapidly, but as soon as complete dissolution has occurred, precipitation of a solid, nearly colorless compound takes place. The analysis of a test taken out shows that under the action of hydrazine ergotamine has been transformed into the difficultly soluble ergotaminine. The suspension is then heated further and after about 20 hours it can be observed that complete dissolution has taken place. The brownish solution is then concentrated in vacuo to about 5 parts, whereby the lysergic acid hydrazide begins to precipitate in form of a crystalline greyish powder. In order to complete the precipitation the reaction mass is left to stand for 1 to 2 days in a cool place and the new compound isolated and purified in the manner described in Example 1. Yield 0.26 part, what corresponds to 68 per cent of the theory.

*Example 3*

One part of ergotinine is suspended in 10 parts of hydrazine hydrate and heated under a reflux condenser to the boil. After 20 to 30 minutes boiling complete solubilization of the alkaloid has taken place and after further boiling for about 5 minutes the reaction mixture is concentrated to about 5 parts. On cooling down the hydrazide begins to crystallize out from the yellowish reaction solution and is isolated as described above. Yield about 0.25 part or about 60 per cent of the theory.

*Example 4*

One part of the isomorphous crystallized mixture of ergotamine and ergotaminine, known under the name of sensibamine is dissolved in 5 parts of propylalcohol; to this solution are then added 5 parts of hydrazine hydrate and heated for 10 hours under a reflux condenser to the boil. After concentration of the solution in vacuo, the hydrazide is isolated as described above. Yield 0.2–0.3 part.

*Example 5*

5 parts of a noncrystallizable raw product giving the Keller's color reaction and obtained from the motherlyes of ergotamine extraction are suspended in 30 parts of hydrazine hydrate and heated during 5 hours in a closed vessel and under pressure at 115° C. After separation from the insoluble products the brown hydrazine solution is concentrated to about 10 parts and left to stand in a cool place, whereby the lysergic acid hydrazide precipitates out as a grey crystalline powder which after recrystallization will be obtained in quite pure state.

What we claim is:—

1. A process for the manufacture of lysergic acid hydrazide, comprising heating lysergic acid derivatives selected from the class consisting of esters and amides of lysergic acid with hydrazine hydrate.

2. A process for the manufacture of lysergic acid hydrazide, comprising heating lysergic acid derivatives selected from the class consisting of esters and amides of lysergic acid with hydrazine hydrate at a temperature of 80–118° C. under a reflux condenser.

3. A process for the manufacture of lysergic acid hydrazide, comprising heating lysergic acid derivatives selected from the class consisting of esters and amides of lysergic acid with hydrazine hydrate at a temperature of 80–118° C. under a reflux condenser, in presence of an organic solvent and in inert atmosphere.

4. A process for the manufacture of lysergic acid hydrazide, comprising heating lysergic acid derivatives selected from the class consisting of esters and amides of lysergic acid with hydrazine hydrate in a closed vessel and under pressure at a temperature of 80–160° C.

5. A process for the manufacture of lysergic acid hydrazide, comprising heating lysergic acid derivatives selected from the class consisting of esters and amides of lysergic acid with hydrazine hydrate in a closed vessel and under pressure at a temperature of 80–160° C. in presence of an organic solvent.

6. A process for the manufacture of lysergic acid hydrazide, comprising heating lysergic acid amides with hydrazine hydrate.

7. A process for the manufacture of lysergic acid hydrazide, comprising heating ergotamine with hydrazine hydrate in nitrogen atmosphere at a temperature of 100° C.

8. A process for the manufacture of lysergic acid hydrazide, comprising heating ergotinine with hydrazine hydrate at a temperature of 118° C.

9. A process for the manufacture of lysergic acid hydrazide, comprising heating isomorphous crystallized mixtures of ergotamine and ergotaminine in presence of a solvent at a temperature of 100° C.–120° C.

10. The lysergic acid hydrazide of the formula $C_{16}H_{18}ON_4$, which is a colorless compound, crystallizing from hot absolute ethanol in compact, clear plates cut on six sides and melting with decomposition at 235–240° C. (corr.), which is very difficultly soluble in water, ether, benzene and chloroform, but better soluble in pyridine and hot absolute ethanol, which yields with acids water soluble salts and gives on Keller's reaction a blue coloration and on Van Urk's reaction a violet-red zone.

ARTHUR STOLL.
ALBERT HOFMANN.